(No Model.) 2 Sheets—Sheet 1.

D. BEST.
COMBINED HARVESTER AND THRASHER.

No. 410,307. Patented Sept. 3, 1889.

Witnesses,
Geo. H. Strong
J. H. Truse

Inventor,
Dan'l Best
By Dewey & Co.
atty (No Model.) 2 Sheets—Sheet 2.

D. BEST.
COMBINED HARVESTER AND THRASHER.

No. 410,307. Patented Sept. 3, 1889.

Witnesses,
Geo. H. Strong
J. H. Nurse

Inventor,
Danl Best
By Dewey & Co.
Attys

UNITED STATES PATENT OFFICE.

DANIEL BEST, OF SAN LEANDRO, CALIFORNIA.

COMBINED HARVESTER AND THRASHER.

SPECIFICATION forming part of Letters Patent No. 410,307, dated September 3, 1889.

Application filed November 22, 1888. Serial No. 291,590. (No model.)

*To all whom it may concern:*

Be it known that I, DANIEL BEST, of San Leandro, Alameda county, State of California, have invented an Improvement in Combined Harvesters and Thrashers; and I hereby declare the following to be a full, clear, and exact description of the same.

My invention relates to that class of agricultural implements known as "combined harvesters and thrashers," and to the connection therewith of a traction-engine, whereby the apparatus is drawn about the field, and a secondary engine by which the entire mechanism of the harvester and thrasher is driven independently; and my invention consists in the construction and combination of devices, which I shall hereinafter fully describe and claim.

Figure 1:
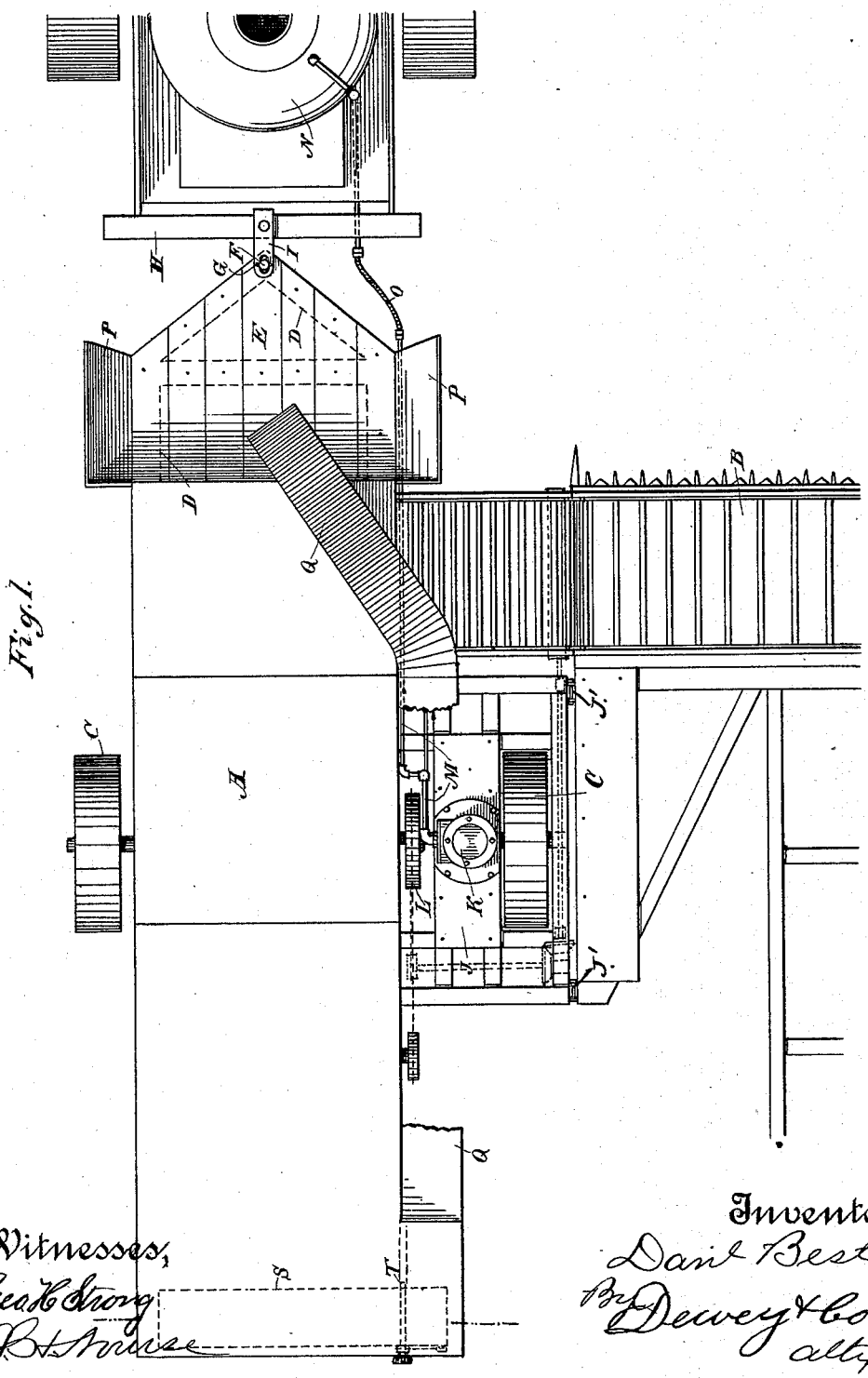
Figure 2:
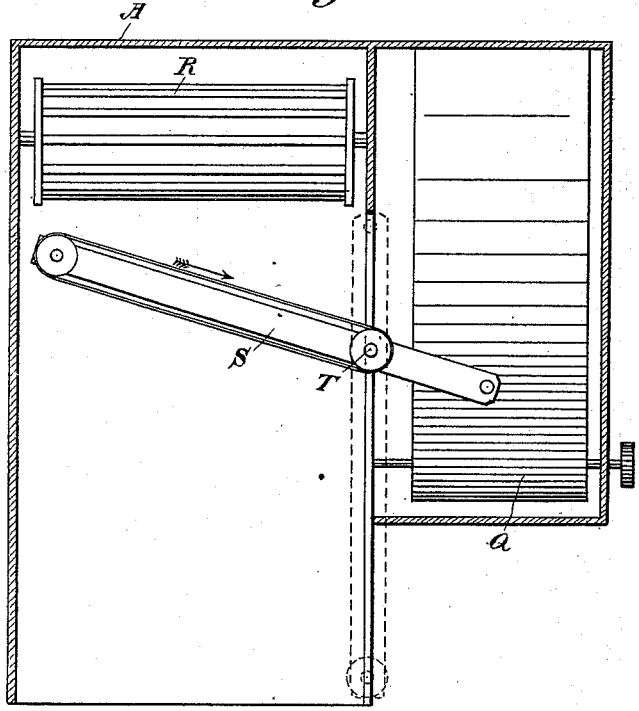
Figure 3:
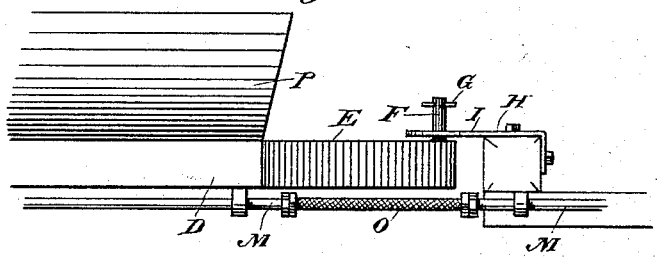

Figure 1 is a plan view of my machine. Fig. 2 is a sectional view of the thrasher, showing the movable straw-carrier and carrier for delivering straw to the forward end of the thrasher. Fig. 3 is a detail of the coupling device.

A is the thrashing and separating or cleaning apparatus, of any of the usual or well-known forms which are drawn about the field by power applied at the front of the thrasher, and it has a heading apparatus B, which is suitably connected with the thrasher, extending to one side from the thrasher, so as to cut the standing grain and convey it to the thrashing mechanism.

As the header and thrasher mechanism form no part of my present invention, I have not especially illustrated any of the features of their construction, but confine myself to those points which I consider novel. The rear portion of the thrashing-machine is supported upon two large bearing-wheels C C, mounted upon a suitable axle or axles, and if the machine is to be used with either traction-engine or horses the front end may be supported upon a single wheel or pair of wheels, which will support it when it is to be drawn about the field by horses. It is my intention to draw this machine about the field by means of a traction-engine, in which case the front wheel or wheels of the harvester and thrasher may be dispensed with, if desired, and the front end supported upon the rear end of the traction-engine; but the connection may also be made without dispensing with the front wheel.

In order to make the union between the thrasher and the traction-engine in such a manner that they may be easily connected and disconnected, the front end of the thrashing-machine has the timbers D strongly connected with the front end of the longitudinal parallel timbers which form the base of the thrashing-machine frame. These timbers D are inclined toward each other, so as to form a V shape, with the apex at the front, and this forward extension is provided with a floor or platform E, which takes the place of the usual timbers supporting the driver's seat in the ordinary machines. Through the front of the timbers D at their apex is fixed a stout vertical bolt F, having a transverse hole made through its upper end to receive the pin G.

H is the rear timber of the traction-engine frame, and it has a stout iron strap or yoke I firmly bolted to its central portion, so that its end projects backward sufficiently to reach over the upright bolt F upon the front of the thrasher. A hole is made through the strip I, so that it will fit over the bolt F, and, the pin G being introduced, the two will be connected by a swivel-joint, which will allow the engine to turn and draw the harvester to any point desired.

The machinery of the thrasher, separator and cleaner, and the header is usually driven from power derived from the bearing-wheels C C of the machine through intermediate gearing or belt-pulleys. In place of this I construct a platform J upon the side of the thrashing-machine, and forming a part of the same, and between the thrashing-machine and the right-hand bearing-wheel C, the said platform being connected with the header at J' by any well-known form of hinge-joint. I mount upon this platform a supplemental engine K, of sufficient power to drive the machinery of the harvester and thrasher, power being taken from the driving-wheel L of the engine and transferred by various pulleys and belts in the manner similar to that employed on the ordinary harvesters. In order to reduce the weight which is carried upon this portion of the machine, I dispense with any boiler at this point, and extend a pipe M from the engine K to the forward portion of the thrashing-machine. This pipe is connected with the boiler N of the traction-engine by means of a flexible coupling-pipe O, which is easily connected when the traction-engine is in place in front of the thrasher, and is readily disconnected when it is desired to separate the harvester and thrasher and traction-engine. By this construction I reduce the weight carried upon the harvester to the smallest amount consistent with the work to be done, and provide an ample supply of steam for the supplemental engine K whenever it is to be used.

In order to supply fuel to the traction-engine and to provide a convenient receptacle for it, I build up the sides P upon the forward platform E, previously described, and a conveyer or carrier Q stands along the side of the thrashing-machine, with its front end curved so as to discharge into the receptacle upon the front floor or platform. The rear end of this carrier or conveyer terminates at the rear of the thrashing-machine proper and upon the right-hand side. The straw which is discharged at the rear of the thrasher from the straw-carrier R may, when the engine is not used, be discharged at the rear of the machine in the ordinary manner; but when the engine is to be used I employ a supplemental carrier S, which is mounted transversely behind and just below the straw-carrier R, so that straw from carrier R will fall upon the transverse carrier S and just below the straw-carrier R. This carrier S travels, as shown by the arrow, toward the right, and transfers the straw to the carrier Q, above described, and by which it is carried to the front and deposited in the receptacle for the use of the engine. When a sufficient quantity of straw has accumulated in the receptacle, or when, for other reasons, it is desired either temporarily or permanently to cut off the supply of straw to the front, the transverse carrier S is turned about the swivel-shaft T, which unites it to the side of the thrashing-machine frame, and when thus turned it stands in a vertical position, as shown by dotted lines in Fig. 2. In this position it will receive no straw from the straw-carrier R, and no further supply will be brought to the front of the machine until it is again turned into its horizontal or inclined position beneath the carrier R. The swivel-shaft about which it turns also carries the driving-pulley by which the belt of this transverse carrier is propelled, and consequently it may easily be turned to the horizontal or vertical position without affecting its operation. If desired, the movement of this carrier may be stopped at any time when it is thrown into the vertical position by means of any well-known or ordinary clutch mechanism.

I am aware that harvesters have been drawn and propelled about the field by means of an engine connected therewith in various ways. I am also aware that supplemental engines have been employed to drive the mechanism of the harvester, and I do not therefore claim, broadly, such device; but What I do claim as new, and desire to secure by Letters Patent, is—

1. In a combined steam traction harvester and thrasher, the combination of a header with a reciprocating sickle at the front and carrying belt by which the cut straw is transferred to the thrashing-cylinder, a thrashing-machine mounted upon a frame with wheels, by which it is supported, and a hinge joint or connection whereby the header is united to the side of the thrashing-machine frame, and an engine mounted upon a platform at one side of the thrashing-machine frame, with connections to drive the header and thrasher, and a steam-supply pipe leading from it to the forward end of the thrashing-machine frame, in combination with a traction-engine with a pivoted connection, whereby the rear of the traction-engine may be connected to or disconnected from the front of the thrashing-machine frame, and a flexible pipe connecting the boiler of the traction-engine with the steam-supply pipe of the engine which is carried upon the thrashing-machine frame, substantially as described.

2. A combination steam traction harvester and thrasher comprising a cutting, thrashing, and cleaning mechanism supported upon wheels, so as to be drawn about the field, a traction-engine with a jointed connection, whereby it may be united with or disconnected from the front of the thrashing-machine, a supplemental engine mounted upon a platform at the side of the thrashing-machine, with connections therefrom to drive the heading and thrashing mechanism, and having a steam-supply pipe leading from it to the front of the thrashing-machine frame, and a flexible connection between said pipe and the boiler of the traction-engine, substantially as and for the purpose herein described.

3. A combined steam traction harvester and thrasher having an extension and receptacle at the front end of the thrashing-machine frame, a jointed connection upon the front of said frame, whereby it is connected with or disconnected from a traction-engine, a carrier Q, the front end of which delivers into the receptacle at the front end of the thrashing-machine, and a supplemental carrier S, receiving straw from the main straw-carrier of the thrashing-machine and delivering it upon the carrier Q, substantially as described.

In witness whereof I have hereunto set my hand.

DANIEL BEST.

Witnesses:
S. H. NOURSE,
H. C. LEE.